United States Patent
Kishiro

(10) Patent No.: US 10,767,519 B2
(45) Date of Patent: Sep. 8, 2020

(54) VALVE STEM SEAL AND HERMETIC SEALING STRUCTURE

(71) Applicant: NOK CORPORATION, Tokyo (JP)

(72) Inventor: Masamichi Kishiro, Fukushima (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 15/893,853

(22) Filed: Feb. 12, 2018

(65) Prior Publication Data
US 2018/0163580 A1 Jun. 14, 2018

Related U.S. Application Data

(63) Continuation of application No. PCT/JP2016/073530, filed on Aug. 10, 2016.

(30) Foreign Application Priority Data

Aug. 20, 2015 (JP) .................. 2015-162478

(51) Int. Cl.
*F16J 15/32* (2016.01)
*F01L 3/08* (2006.01)
*F16J 15/3232* (2016.01)
*F16J 15/3212* (2016.01)

(52) U.S. Cl.
CPC ............. *F01L 3/08* (2013.01); *F16J 15/3232* (2013.01); *F16J 15/3212* (2013.01)

(58) Field of Classification Search
CPC .... F16J 15/322; F16J 15/3232; F16J 15/3204; F16J 15/3208; F16J 15/3212; F01L 3/08
USPC ............. 251/330, 214, 335.1, 318; 277/313; 123/188.2, 188.6
See application file for complete search history.

(56) References Cited

U.S. PATENT DOCUMENTS 3,699,942 A * 10/1972 Moray ............. F01L 3/08
123/188.6
4,623,153 A * 11/1986 Nagasawa .......... F16J 15/322
277/551
(Continued)

FOREIGN PATENT DOCUMENTS

EP 2 363 580 A2 9/2011
JP 46-009617 Y 4/1971
(Continued)

OTHER PUBLICATIONS

International Search Report (with English translation) and Written Opinion for corresponding International Application No. PCT/JP2016/073530 dated Sep. 20, 2016.
(Continued)

*Primary Examiner* — Kelsey E Cary
(74) *Attorney, Agent, or Firm* — Pearne & Gordon LLP

(57) ABSTRACT

A valve stem seal hermetically seals a space formed between a valve stem of a valve which establishes and interrupts communication between a cylinder and a port and a valve guide into which the valve stem is inserted in a reciprocally movable manner, wherein the valve stem seal includes: a reinforcing ring formed into an annular shape centered about an axis, and extending in a radial direction of a ring of the reinforcing ring; and an elastic body portion formed into an annular shape centered about the axis, attached to the reinforcing ring, and including a seal lip which abuts on the valve stem.

15 Claims, 11 Drawing Sheets

(56) References Cited

U.S. PATENT DOCUMENTS

| | | | | |
|---|---|---|---|---|
| 4,805,568 A * | 2/1989 | Springer | ............... | F01L 1/12 123/188.9 |
| 5,110,142 A | 5/1992 | Szott | | |
| 5,558,056 A * | 9/1996 | Sakata | ............... | F01L 3/08 123/188.6 |
| 6,830,025 B2 * | 12/2004 | Leimer | ............... | F01L 3/08 123/188.2 |
| 6,901,902 B1 * | 6/2005 | Butcher | ............... | F01L 3/08 123/188.6 |
| 7,559,302 B2 * | 7/2009 | Cullen | ............... | F01L 1/462 123/188.11 |
| 8,601,991 B2 | 12/2013 | Pawl et al. | | |
| 2005/0001196 A1 * | 1/2005 | McArthy | ............... | F01L 3/08 251/214 |
| 2006/0065227 A1 * | 3/2006 | Hegemier | ............... | F01L 3/08 123/188.6 |
| 2006/0169942 A1 * | 8/2006 | Hesher | ............... | F01L 3/08 251/337 |
| 2009/0126673 A1 * | 5/2009 | Cullen | ............... | F01L 1/462 123/193.5 |
| 2011/0024666 A1 * | 2/2011 | London | ............... | F01L 3/08 251/366 |
| 2013/0032118 A1 * | 2/2013 | Pawl | ............... | F01L 3/08 123/193.5 |
| 2013/0192555 A1 * | 8/2013 | Nguyen | ............... | F01L 3/08 123/188.6 |

FOREIGN PATENT DOCUMENTS

| | | |
|---|---|---|
| JP | 02-40137 U | 3/1990 |
| JP | 04-052663 U | 5/1992 |
| JP | H04-117107 A | 10/1992 |
| JP | 2002-188416 A | 7/2002 |
| JP | 2004-176881 A | 6/2004 |

OTHER PUBLICATIONS

English Translation of the Written Opinion of the International Search Authority, dated Sep. 20, 2016, for corresponding International Application No. PCT/JP2016/073530.

English Translation of the International Preliminary Report on Patentability Chapter 1, dated Feb. 20, 2018, for corresponding International Application No. PCT/JP2016/073530.

Extended European Search Report for corresponding European Application No. 16837050.0 dated Feb. 19, 2019.

Chinese Office Action dated Mar. 18, 2019 for corresponding Chinese Application No. 201680047541.7 and English translation.

Chinese Office Action dated Sep. 25, 2019 for corresponding Chinese Application No. 201680047541.7 and English translation.

European Office Action dated Dec. 2, 2019 for corresponding European Application No. 16 837 050.0.

Chinese Office Action dated Mar. 3, 2020 for corresponding Chinese Application No. 201680047541.7 and English translation.

Japanese Office Action dated May 7, 2020 for corresponding Japanese Application No. 2017-535504 and English transtation.

Chinese Rejection Decision dated Jun. 3, 2020 for corresponding Chinese Application No. 201680047541.7 and English translation.

* cited by examiner

[FIG. 1]
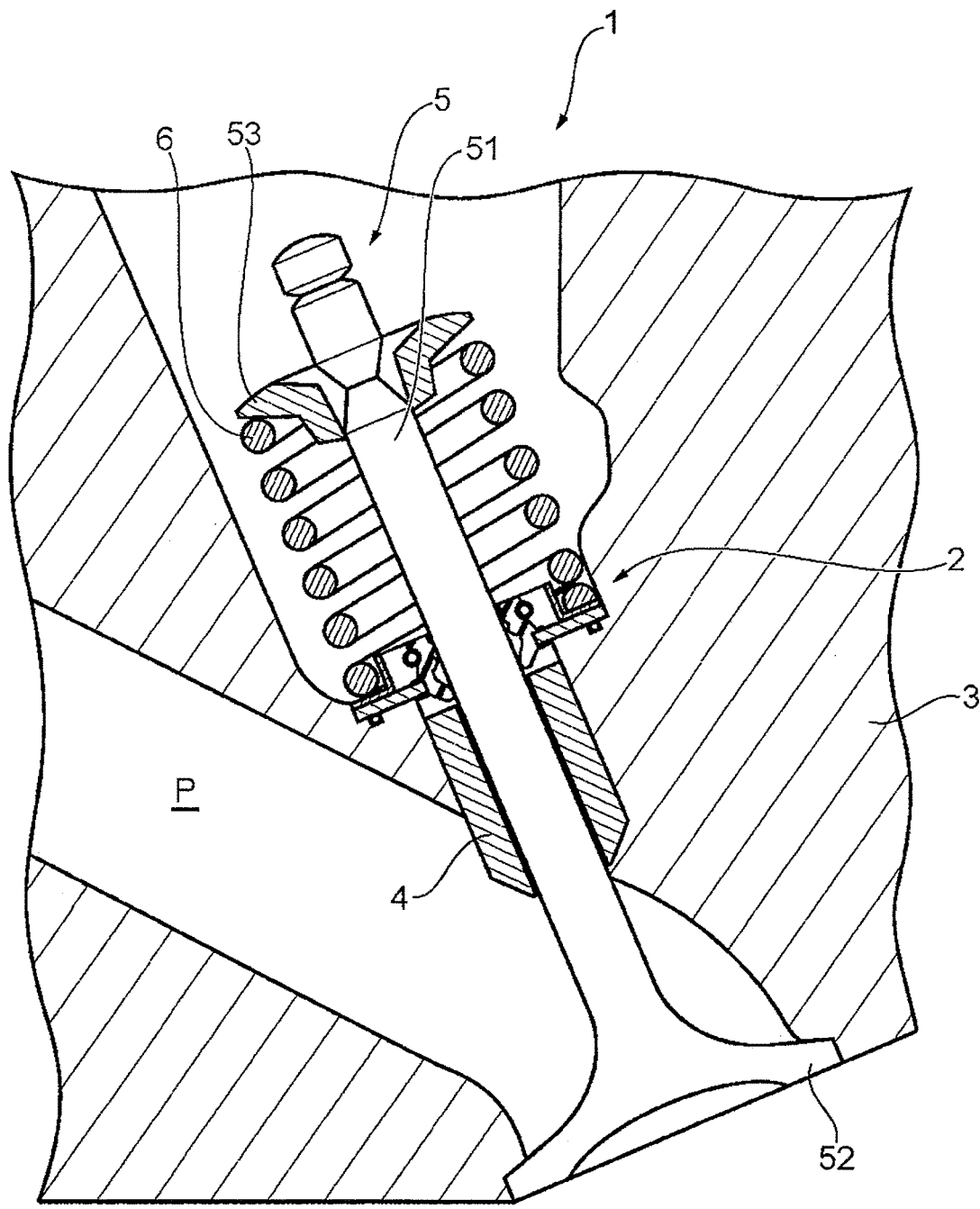

[FIG. 2]
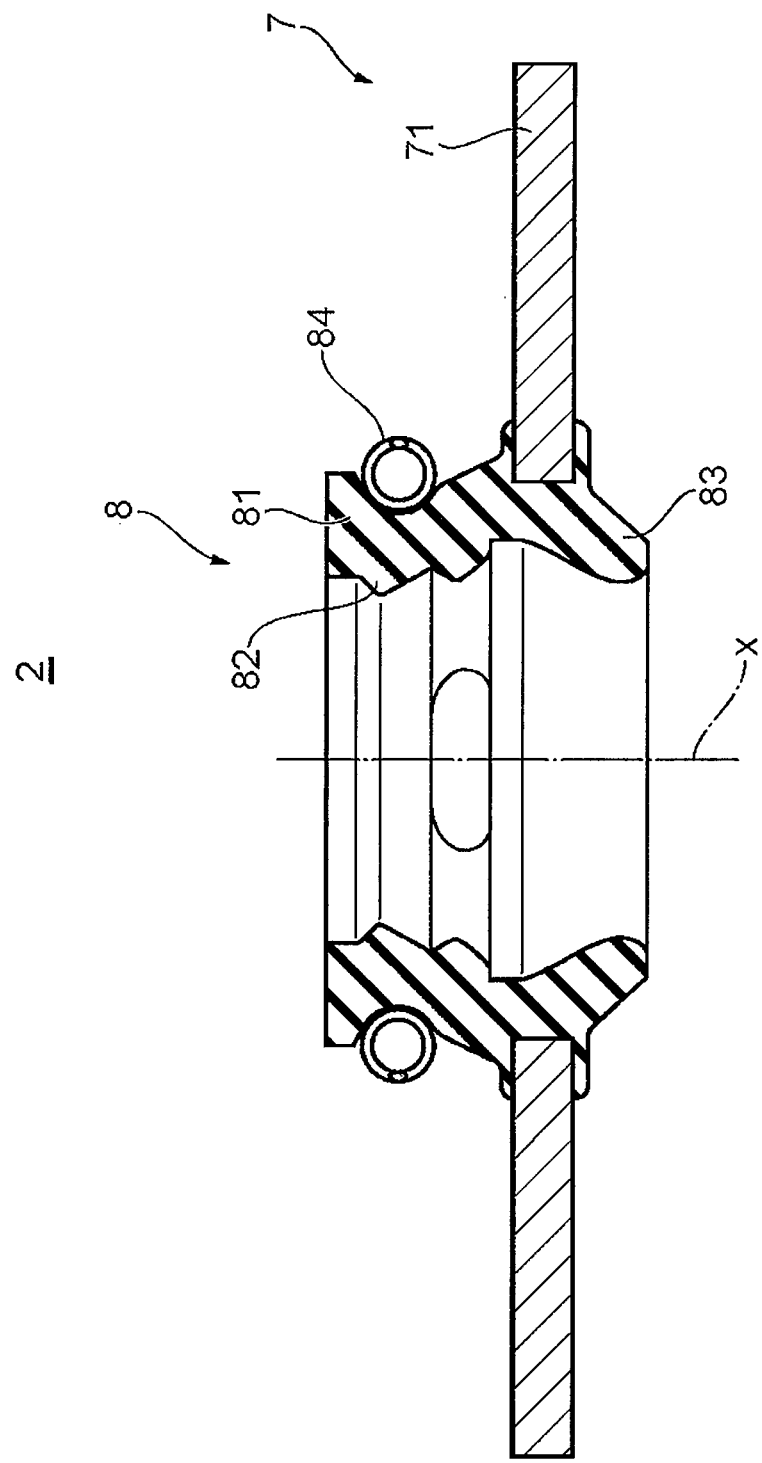

[FIG. 3]
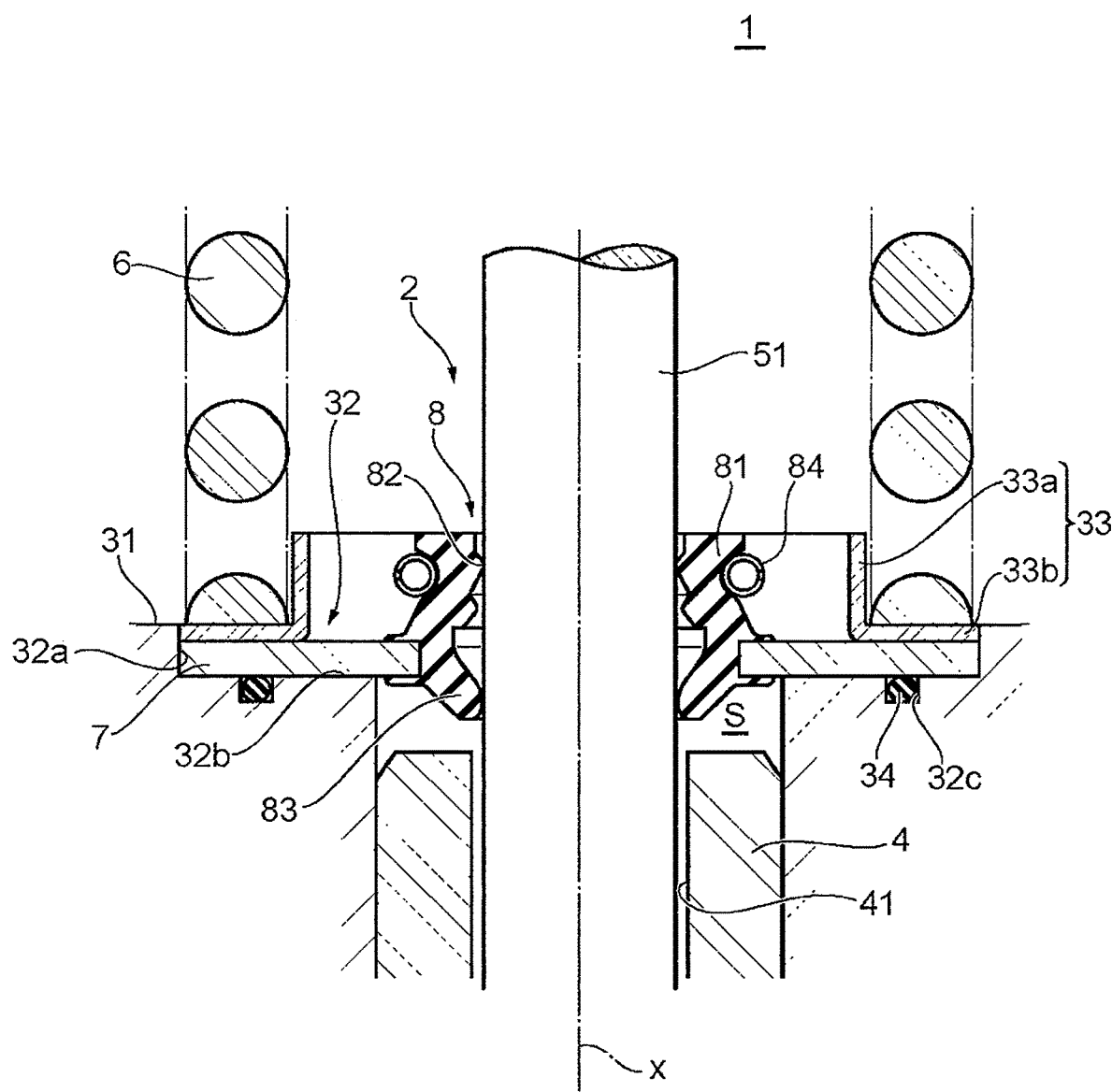

[FIG.4]
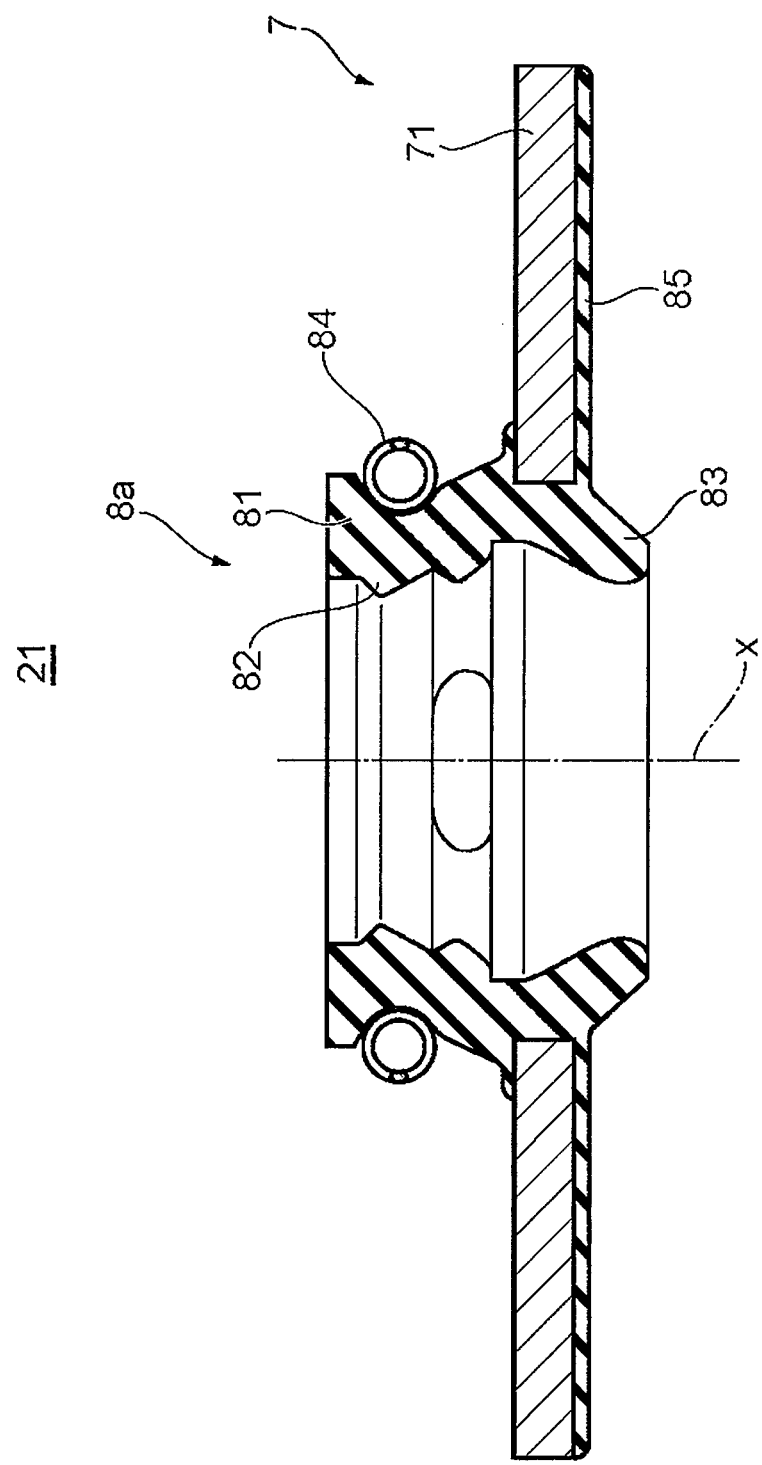

[FIG. 5]
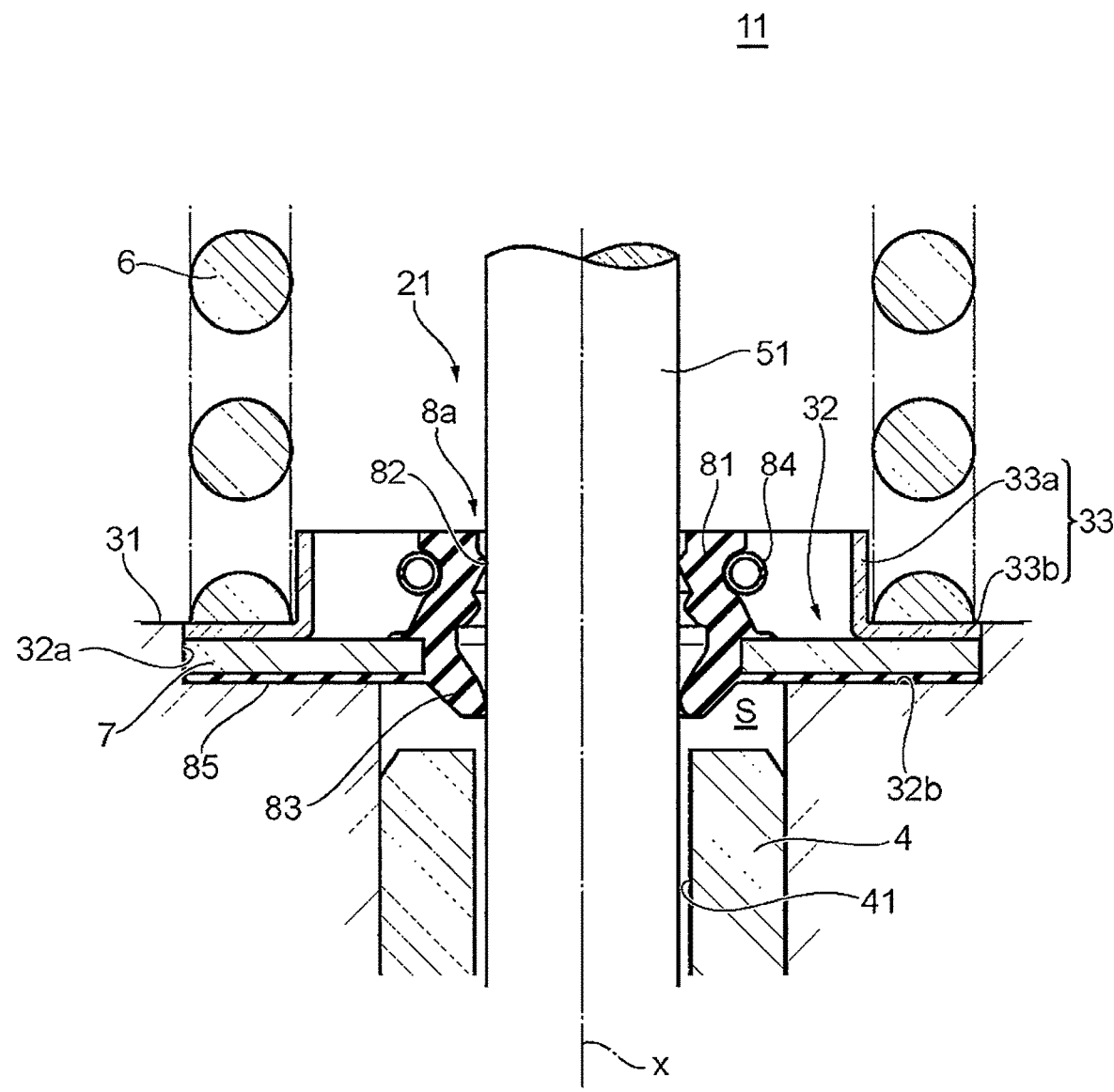

[FIG. 6]
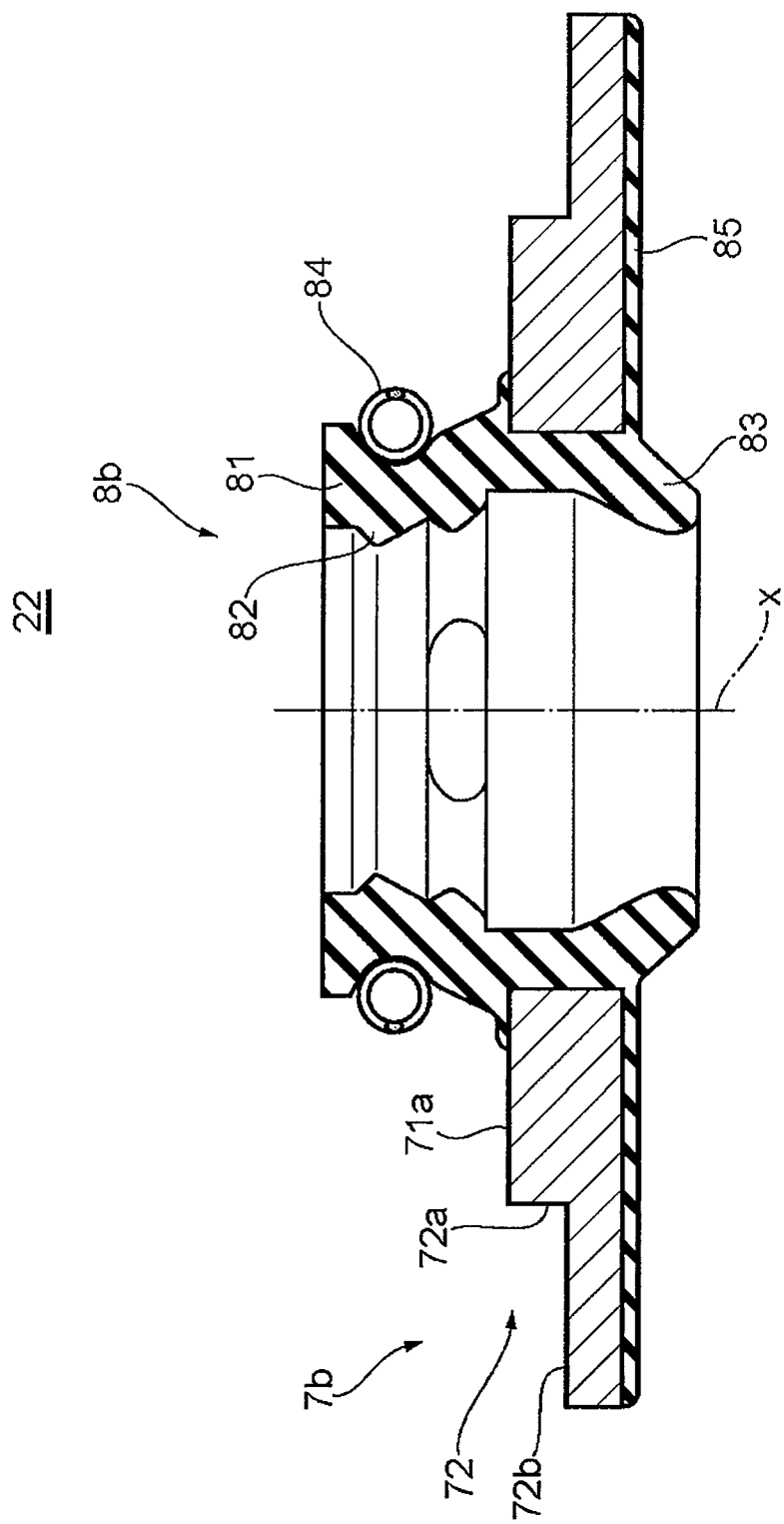

[FIG. 7]
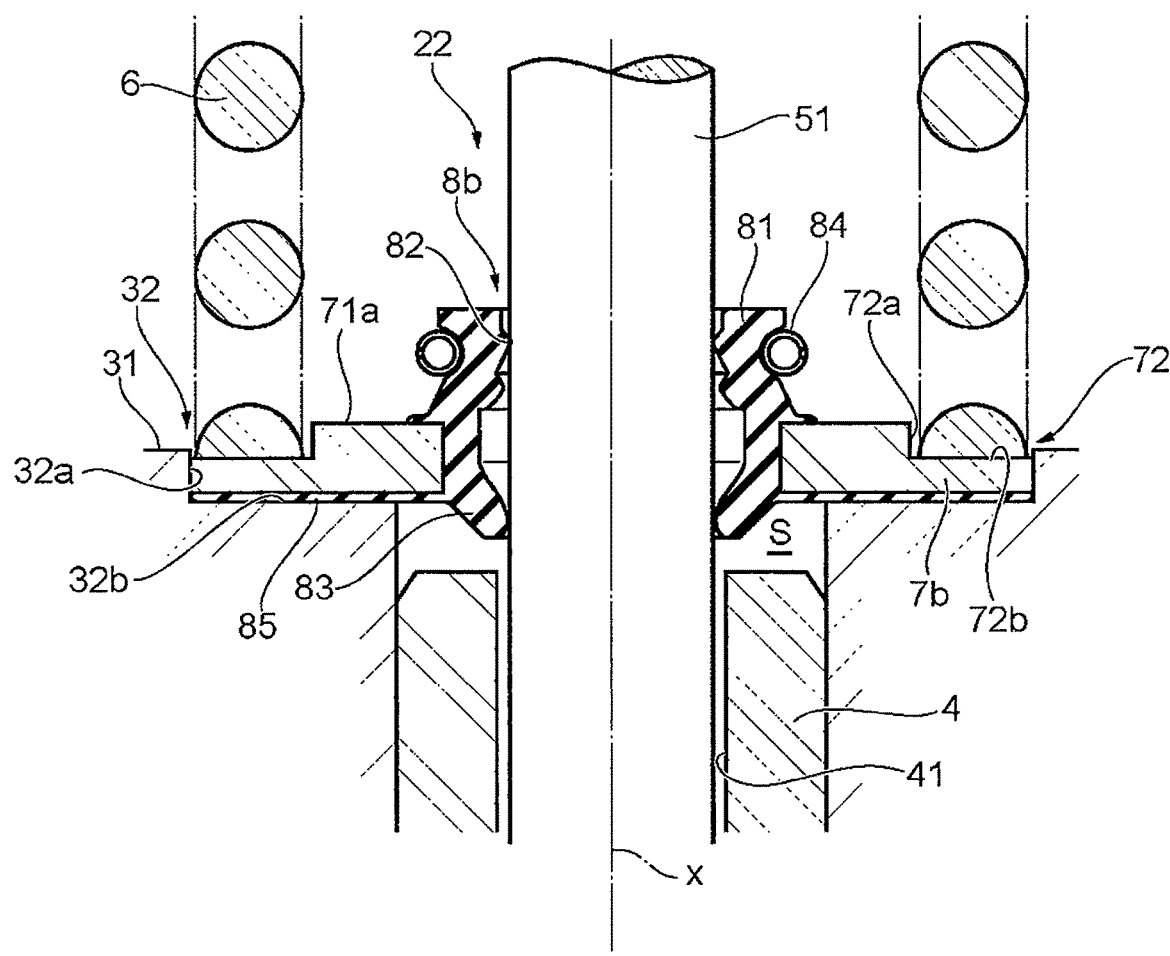

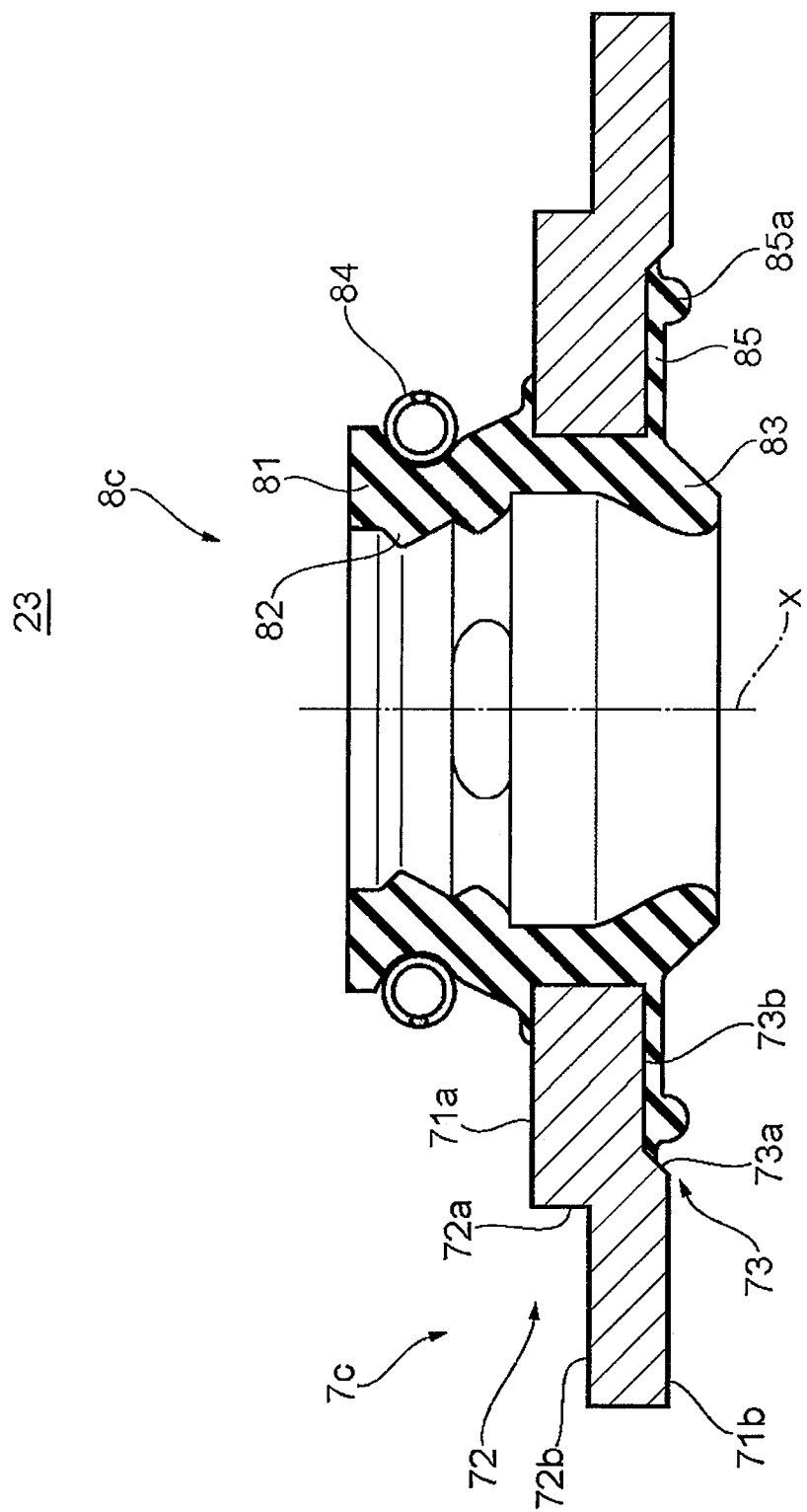
[FIG. 8]

[FIG. 9]
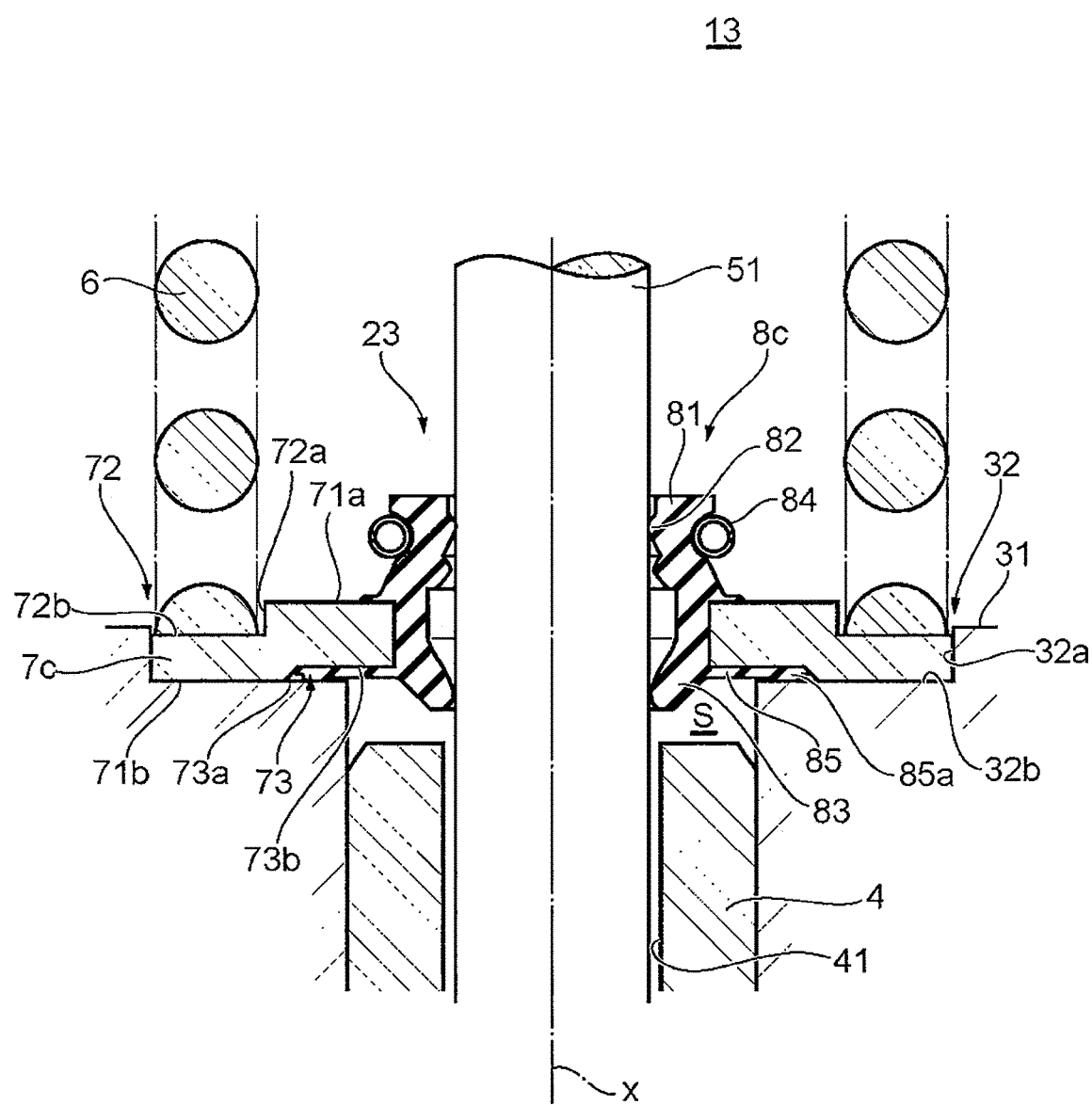

[FIG. 10]
-- PRIOR ART --
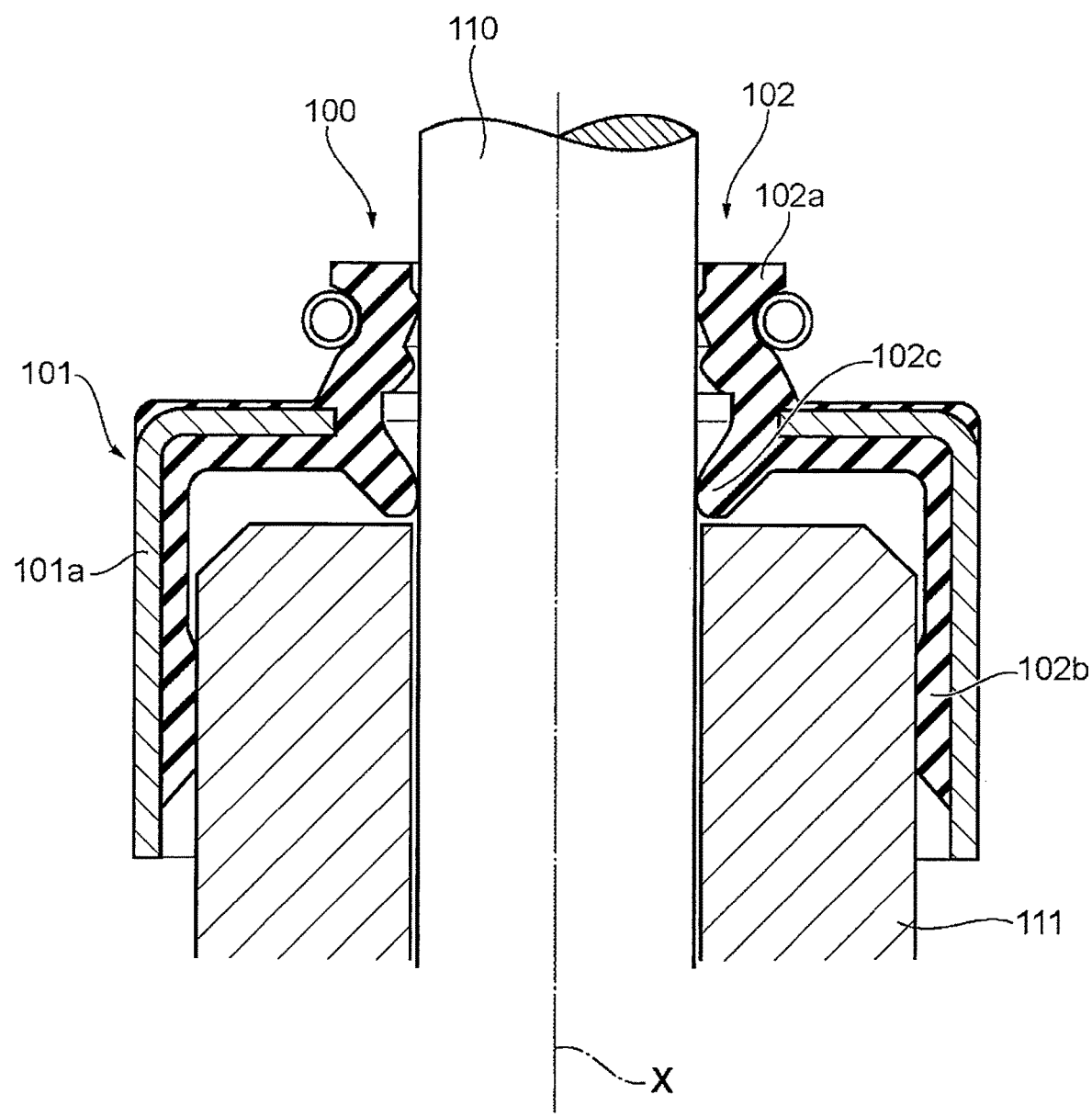

【FIG. 1 1】
-- PRIOR ART --
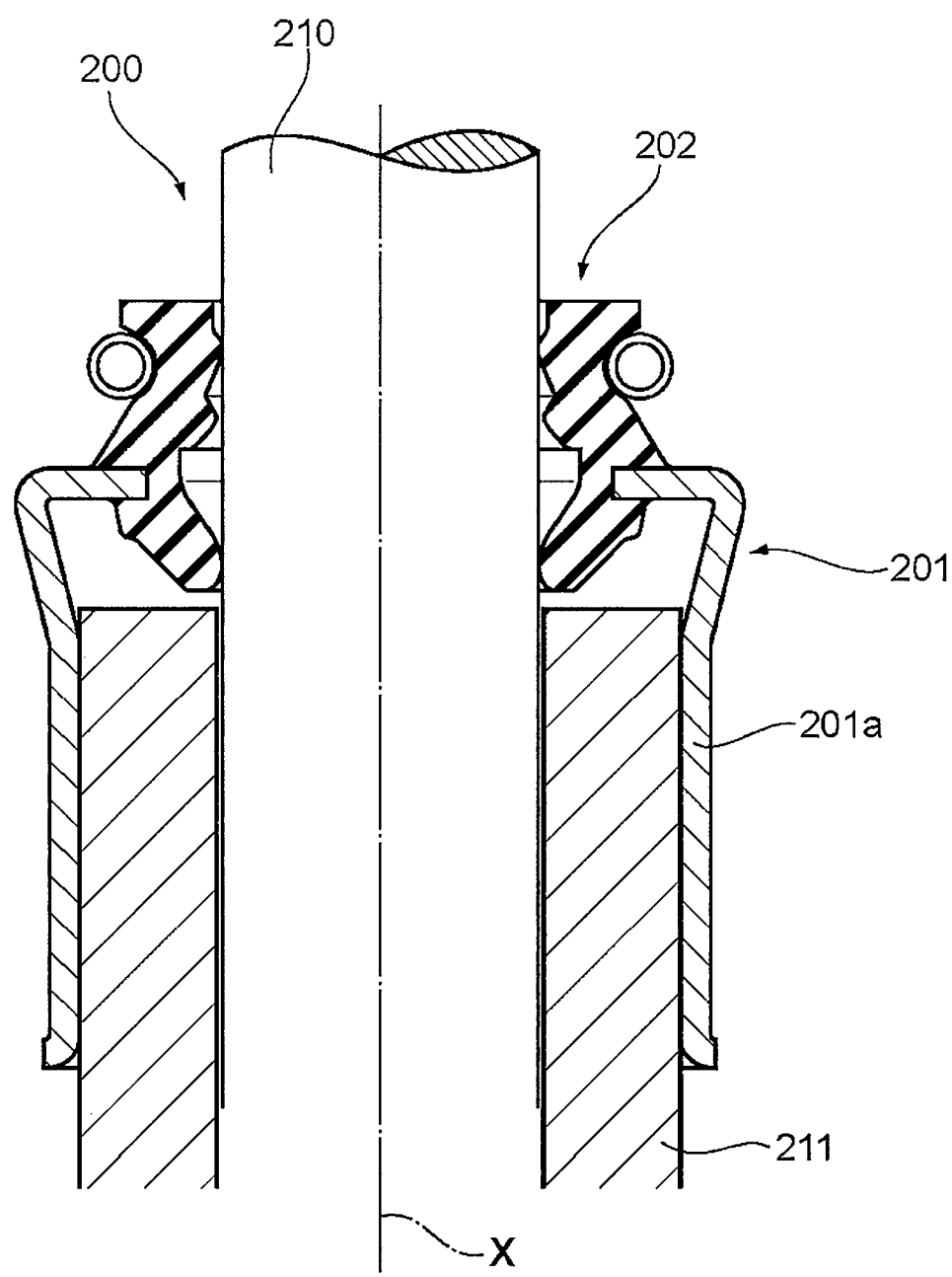

VALVE STEM SEAL AND HERMETIC SEALING STRUCTURE

The present application is a continuation application of International Application No. PCT/JP2016/073530, filed on Aug. 10, 2016, which claims priority to Japanese Patent Application No. 2015-162478, filed on Aug. 20, 2015. The contents of these applications are incorporated herein by reference in their entirety.

BACKGROUND

Technical Field

The present disclosure relates to a valve stem seal and a hermetic sealing structure using the valve stem seal.

Background Art

Conventionally, in an internal combustion engine, a valve stem seal is used so as to hermetically seal a space between a valve stem and a valve guide of an intake/exhaust valve which reciprocates between the cam side and the cylinder side. The valve stem seal suppresses damage of the valve guide and the valve stem caused due to small amounts of oil leakage (an amount of lubricating oil supplied between the valve stem and the valve guide) during the operation of the internal combustion engine. Further, to prevent problems such as generation of white smoke caused due to large amounts of oil leakage, the valve stem seal supplies a lubricating oil, which allows the valve stem to smoothly reciprocate, between the valve guide and the valve stem while adjusting an amount of oil leakage, and the valve stem seal prevents inflow of the lubricating oil into a port or a cylinder (combustion chamber).

FIG. 10 is a cross-sectional view showing a conventional valve stem seal 100 together with a valve stem 110 in a state where the valve stem seal 100 is attached to a valve guide 111. The valve stem seal 100 includes a reinforcing ring 101 made of metal, and an elastic body portion 102 which is integrally formed with the reinforcing ring 101 and is formed of an elastic body made of rubber or the like.

The reinforcing ring 101 includes a cylindrical portion 101a extending in the direction of an axis x. The elastic body portion 102 integrally includes a sealing portion 102a and a fitting portion 102b. The sealing portion 102a includes a back pressure lip 102c so as to prevent a back pressure from the cylinder side from transmitting to the cam side. The fitting portion 102b is a portion which functions when the valve stem seal 100 is fitted on the valve guide 111, and the fitting portion 102b covers the cylindrical portion 101a of the reinforcing ring 101 from the inside.

FIG. 11 is a cross-sectional view showing a conventional valve stem seal 200 together with a valve stem 210 in a state where the valve stem seal 200 is attached to a valve guide 211. The valve stem seal 200 includes a reinforcing ring 201 made of metal, and an elastic body portion 202 which is integrally formed with the reinforcing ring 201 and is formed of an elastic body made of rubber or the like.

The reinforcing ring 201 includes a cylindrical portion 201a extending in the direction of an axis x, and the cylindrical portion 201a is directly fitted on the valve guide 211.

A valve stem seal has been also proposed where, different from the conventional valve stem seals shown in FIG. 10 and FIG. 11, a reinforcing ring includes: a cylindrical portion extending toward the cam side along an axis; and a radial direction portion extending from one end of the cylindrical portion along the radial direction, the cylindrical portion is made to strike a recessed portion of a cylinder head, and the radial direction portion is pressed and fixed by a valve spring (for example, see Japanese Utility Model Application Publication No. 4-117107).

Recently, due to miniaturization of internal combustion engines for the purpose of further improving vehicle fuel economy, due to provision of a turbocharger or the like, there is a tendency that a pressure from the cylinder side (back pressure) caused by an increase in port pressure increases. Accordingly, there has been a demand for a valve stem seal which can tolerate an increase in back pressure.

However, in the valve stem seal 100 shown in FIG. 10, the fitting portion 102b of the elastic body portion 102 is fitted on the valve guide 111. Accordingly, to prevent elastic deformation in the fitting portion 102b caused by a back pressure causing the valve stem seal 100 to be removed from the valve guide 111, it is necessary to increase a length of the cylindrical portion 101a in the direction of the axis x by an amount corresponding to at least a length of the fitting portion 102b.

Further, in the valve stem seal 200 shown in FIG. 11, the cylindrical portion 201a is directly fitted on the valve guide 211 so that the removal of the cylindrical portion 201a caused by a back pressure is prevented. However, a fitting load when mounting the valve stem seal 200 is large so that operation of fitting the valve stem seal 200 is difficult. Further, the valve guide 211 is required to have a length which is at least a length of the cylindrical portion 201a.

Further, in the valve stem seal shown in Japanese Utility Model Application Publication No. 4417107, the reinforcing ring is pressed by the valve spring so that the removal of the reinforcing ring is prevented. However, a space for accommodating the valve stem seal is required by an amount corresponding to a height of the cylindrical portion.

That is, in each of the above-mentioned valve stem seals, the reinforcing ring includes the cylindrical portion extending along the axis so that a height of the reinforcing ring in the direction of the axis increases. In view of the above, there is a demand for the reduction of the installation space for the valve stem seal.

Accordingly, the present disclosure is related to provide a valve stem seal which can prevent the removal thereof due to an increase in back pressure, can be easily assembled to a valve guide, and can reduce the installation space.

SUMMARY

A valve stem seal for hermetically sealing a space formed between a valve stem of a valve which establishes and interrupts communication between a cylinder and a port and a valve guide into which the valve stem is inserted in a reciprocally movable manner, including: a reinforcing ring formed into an annular shape centered about an axis, and extending in a radial direction of a ring of the reinforcing ring; and an elastic body portion formed into an annular shape centered about the axis, attached to the reinforcing ring, and including a seal lip which abuts on the valve stem.

It is preferable that the reinforcing ring includes a portion to be pressed which is disposed between an inner wall of a cylinder head and a valve spring, and is pressed by the valve spring.

A hermetic sealing structure for hermetically sealing a space formed between a valve stem of a valve and a valve guide, the valve establishing and interrupting communication between a cylinder and a port, the valve guide having one end facing a cam side and another end facing a cylinder side, and the valve stem being inserted into the valve guide in a reciprocally movable manner, including: a cylinder head; a valve guide arranged on the cylinder head; the valve stem inserted into the valve guide in a reciprocally movable manner; a valve spring mounted on the cylinder head, and biasing the valve stem in a direction where communication between the cylinder and the port is interrupted; and a valve stem seal provided on the valve guide on a side of one end, wherein the valve stem seal includes: a reinforcing ring formed into an annular shape centered about an axis, and extending in a radial direction of a ring of the reinforcing ring; and an elastic body portion formed into an annular shape centered about the axis, attached to the reinforcing ring, and including a seal lip which abuts on the valve stem, and the reinforcing ring is disposed between an inner wall of the cylinder head and the valve spring, and is fixed to the cylinder head by pressure from the valve spring.

It is preferable that an accommodating portion for accommodating the reinforcing ring is formed on the cylinder head.

It is preferable that one end of the valve guide is disposed at a position more toward the cylinder side than the accommodating portion.

It is preferable that the elastic body portion include a back pressure lip which is disposed on a side closer to the valve guide than the seal lip, and abut on the valve stem, and the back pressure lip is disposed in a space formed between one end of the valve guide and the accommodating portion.

According to the present disclosure, the removal of a valve stem seal due to an increase in back pressure can be prevented, the valve stem seal can be easily assembled to a valve guide, and the installation space for the valve stem seal can be reduced.

BRIEF DESCRIPTION OF DRAWINGS

FIG. 1 is a cross-sectional view showing a schematic configuration of a hermetic sealing structure according to an embodiment of the present disclosure used in an internal combustion engine.

FIG. 2 is a cross-sectional view of a valve stem seal according to a first embodiment taken along an axis.

FIG. 3 is a cross-sectional view showing a part of the hermetic sealing structure using the valve stem seal shown in FIG. 2 in an enlarged manner.

FIG. 4 is a cross-sectional view of a valve stem seal according to a second embodiment taken along an axis.

FIG. 5 is a cross-sectional view showing a part of a hermetic sealing structure using the valve stem seal shown in FIG. 4 in an enlarged manner.

FIG. 6 is a cross-sectional view of a valve stem seal according to a third embodiment taken along an axis.

FIG. 7 is a cross-sectional view showing a part of a hermetic sealing structure using the valve stem seal shown in FIG. 6 in an enlarged manner.

FIG. 8 is a cross-sectional view of a valve stem seal according to a fourth embodiment taken along an axis.

FIG. 9 is a cross-sectional view showing a part of a hermetic sealing structure using the valve stem seal shown in FIG. 8 in an enlarged manner.

FIG. 10 is a cross-sectional view of a hermetic sealing structure using a conventional valve stem seal.

FIG. 11 is a cross-sectional view of a hermetic sealing structure using a conventional valve stem seal.

DETAILED DESCRIPTION

Preferred embodiments of the present disclosure will be described with reference to drawings. The embodiments described hereinafter are merely for the sake of example, and can take any of various modes.

First Embodiment

Configuration of Hermetic Sealing Structure

FIG. 1 is a cross-sectional view showing a schematic configuration of a hermetic sealing structure 1 which includes a valve stem seal 2 according to a first embodiment of the present disclosure. FIG. 2 is a cross-sectional view showing a cross section of the valve stem seal 2 taken along the direction of an axis x. FIG. 3 is a cross-sectional view showing a part of the hermetic sealing structure 1 which includes the valve stem seal 2 shown in FIG. 2 in an enlarged manner.

The hermetic sealing structure 1 is used in a valve system of an internal combustion engine. The hermetic sealing structure 1 includes: a cylinder head 3; a valve guide 4 arranged on the cylinder head 3; a valve 5 inserted into the valve guide 4 in a reciprocally movable manner; a valve spring 6 mounted on the cylinder head 3, and biasing the valve 5 in the direction where communication between a cylinder and a port P is interrupted; and a valve stem seal 2 provided on one end side of the valve guide 4.

(Valve Stem Seal)

The valve stem seal 2 is provided for hermetically sealing a space formed between the valve guide 4 and a valve stem 51 of the valve 5 in an internal combustion engine. The valve guide 4 has one end thereof facing the cam side and another end thereof facing the cylinder side. The valve 5 establishes and interrupts communication between the cylinder and the port P, and the valve stem 51 of the valve 5 is inserted into the valve guide 4 in a reciprocally movable manner. In a state where the valve stem seal 2 is attached to the cylinder head 3, the valve stem seal 2 is fixed to the cylinder head 3 at one end of the valve guide 4, to be more specific, on one end side of the valve guide 4 which faces the cam side.

As shown in FIG. 2, the valve stem seal 2 includes: a reinforcing ring 7 made of metal which is formed into an annular shape centered about the axis x, and extends in the radial direction of a ring of the reinforcing ring 7; and an elastic body portion 8 in an annular shape centered about the axis x, the elastic body portion 8 being formed of an elastic body attached to the reinforcing ring 7.

The reinforcing ring 7 is manufactured by press working or by forging, for example. The elastic body portion 8 is made of a rubber material such as fluororubber, for example, and is molded by crosslinking (vulcanization) molding using a molding die. In performing crosslinking molding, the reinforcing ring 7 is disposed in the molding die so that the elastic body portion 8 is bonded to the reinforcing ring 7 by crosslinking bonding thus being integrally formed with the reinforcing ring 7.

The reinforcing ring 7 has a hollow disk shape. The reinforcing ring 7 is formed such that a main surface thereof has a flat surface extending along the direction orthogonal to the axis x, and a thickness of the reinforcing ring 7 is uniform. That is, the reinforcing ring 7 is not bent along any portion thereof, and a main surface of the reinforcing ring 7 simply has one flat surface. The reinforcing ring 7 includes a portion to be pressed 71 which is disposed between an inner wall of the cylinder head 3 and the valve spring 6, and is pressed by the valve spring 6.

The elastic body portion 8 includes a seal base portion 81 in an annular shape centered about the axis x, the elastic body portion 8 abutting on the valve stem 51 on the inner periphery side of the elastic body portion 8. The seal base portion 81 integrally includes: a seal lip 82 abutting on the valve stem 51 which extends in the direction of the axis x, and is made to insert through the elastic body portion 8; and a back pressure lip 83 disposed on the side closer to the valve guide 4 (cylinder side) than the seal lip 82 is.

As shown in FIG. 2, the seal lip 82 extends upward from the seal base portion 81, and an upper end portion of the seal lip 82 on the inner periphery side has a distal end portion in an annular shape centered about the axis x. The distal end portion projects inward in the radial direction toward the axis x. That is, a cross-sectional shape of the distal end portion is a wedge shape which projects toward the inner periphery side. As described later, in a use state, the seal lip 82 abuts on the valve stem 51 at the distal end portion of the seal lip 82.

The back pressure lip 83 is a lip extending toward the valve guide 4 from the lower side of the seal base portion 81. To be more specific, the back pressure lip 83 is a lip which is formed into an annular shape centered about the axis x, is disposed at a position below the seal lip 82, and abuts on the valve stem 51.

The elastic body portion 8 is fastened toward the valve stem 51 by a spring 84. The spring 84 is fitted on the outer periphery side of the seal base portion 81. The spring 84 biases the seal lip 82 in the direction toward the axis x thus applying a force to the distil end portion of the seal lip 82 for fastening the valve stem 51 such that the distal end portion follows the displacement of the valve stem 51.

The elastic body portion 8 is attached to an inner peripheral edge portion of the reinforcing ring 7 at a portion of an outer peripheral surface of the elastic body portion 8 disposed below the spring 84 and above the back pressure lip 83.

(Cylinder Head)

As shown in FIG. 1, the cylinder head 3 has the port P, to be more specific, an intake port and an exhaust port. As shown in FIG. 3, an accommodating portion 32 in an annular shape centered about the axis x is formed on an inner wall 31 of the cylinder head 3 which faces the cam side, the accommodating portion 32 accommodating the reinforcing ring 7 of the valve stem seal 2. The accommodating portion 32 has: a side surface portion 32a in an annular shape which extends from the inner wall 31 toward the cylinder side; and a bottom surface portion 32b which extends from an end portion of the side surface portion 32a on the cylinder side toward the axis x.

A groove 32c in an annular shape centered about the axis x is formed on the bottom surface portion 32b. In the groove 32c, an O-ring 34 is disposed which provides sealing between the cylinder head 3 and the reinforcing ring 7. Usually, a form of the O-ring 34 slightly projects from the bottom surface portion 32b in the direction of the axis x. However, when the reinforcing ring 7 is attached, the O-ring 34 is elastically deformed until the O-ring 34 becomes coplanar with the bottom surface portion 32b of the accommodating portion 32 thus performing a sealing function.

(Valve Guide)

As shown in FIG. 3, a cross-sectional shape of the valve guide 4 is a cylindrical shape extending in the direction of the axis x, and the valve guide 4 is fixed to the cylinder head 3 by press fitting. The valve guide 4 has a guide hole 41 which is a through hole into which the valve stem 51 of the valve 5 is inserted in a reciprocally movable manner in the direction of the axis x, and which extends in the direction of the axis x. The guide hole 41 extends between one end of the valve guide 4 on the cam side and another end of the valve guide 4 on the cylinder side, and an inner diameter of the guide hole 41 is larger than an outer diameter of the valve stem 51.

(Valve)

The valve 5 is a valve used for controlling the intake and exhaust of an internal combustion engine by opening and closing a port with respect to the combustion chamber, the port communicating to a combustion chamber. When power is transmitted to one end of the valve stem 51 on the cam side by a cam not shown in the drawing, the valve 5 reciprocates in the direction of the axis x. As shown in FIG. 1, the valve 5 includes the valve stem 51 in a rod shape, and a valve head 52 integrally formed on a lower end of the valve stem 51 on the cylinder side.

The valve stem 51 is inserted into the guide hole 41 of the valve guide 4. A retainer 53 for supporting an upper end portion of the valve spring 6 is fixed to an upper end of the valve stem 51 on the cam side.

(Valve Spring)

The valve spring 6 is disposed between the reinforcing ring 7 and the retainer 53, and biases the valve 5 in the closing direction where communication between the cylinder and the port P is interrupted. The valve spring 6 is compressed such that power of the cam is transmitted to the valve stem 51 so that the valve stem 51 is pushed down toward the cylinder side by way of the retainer 53 whereby the valve head 52 enters the combustion chamber. When the action of the cam is released, the valve spring 6 is restored by an elastic force thereof thus pushing up the retainer 53 toward the cam side so that the valve 5 interrupts communication between the cylinder and the port P.

Hermetic Sealing Structure

Next, the hermetic sealing structure 1 using the valve stem seal 2 is described.

As shown in FIG. 3, the valve guide 4 is fixed to the cylinder head 3 by press fitting, and the valve stem 51 is inserted into the guide hole 41 of the valve guide 4. An upper end portion of the valve guide 4 on the cam side is disposed at a position more toward the cylinder side than the bottom surface portion 32b of the accommodating portion 32 of the cylinder head 3. With such a configuration, a space S is formed between the upper end portion of the valve guide 4 on the cam side and the accommodating portion 32, to be more specific, the bottom surface portion 32b of the accommodating portion 32.

The valve stem seal 2 is concentrically attached to the valve stem 51, and the reinforcing ring 7 is accommodated in the accommodating portion 32 of the cylinder head 3. To be more specific, a peripheral surface of the reinforcing ring 7 on the outer side in the radial direction abuts on the side surface portion 32a, and a surface of the reinforcing ring 7 which faces the bottom surface portion 32b abuts on the bottom surface portion 32b and the O-ring 34 (sealing member). Further, the back pressure lip 83 is positioned in the above-mentioned space S. On a surface of the reinforcing ring 7 which faces the cam side (portion to be pressed 71), a spring washer 33 functioning as a support member which supports a lower end portion of the valve spring 6 is provided. A shape in cross section taken along the axis x (hereinafter also referred to as "cross-sectional shape") of the spring washer 33 is a substantially L shape. The spring washer 33 includes a cylindrical portion 33a in a cylindrical shape extending in the direction of the axis x, and a flange portion 33b extending from an end portion of the cylindrical portion 33a on the cylinder side toward the outside in the radial direction.

A peripheral surface of the flange portion 33b on the outer side in the radial direction abuts on the side surface portion 32a of the accommodating portion 32, and an upper surface of the flange portion 33b is coplanar with the inner wall 31 of the cylinder head 3. That is, a total thickness of the reinforcing ring 7 and the spring washer 33 is equal to a height of the side surface portion 32a of the accommodating portion 32.

The lower end portion of the valve spring 6 is supported by the flange portion 33b of the spring washer 33. The reinforcing ring 7 is disposed between the inner wall 31 of the cylinder head 3 and the valve spring 6, and is fixed to the cylinder head 3 by pressure from the valve spring 6. That is, when the valve stem seal 2 is in a use state, the reinforcing ring 7 is accommodated in the accommodating portion 32 of the cylinder head 3, and is pressed toward the bottom surface portion 32b by the valve spring 6 by way of the spring washer 33. Further, the valve spring 6 is always disposed above the reinforcing ring 7 and hence, there is no possibility that the reinforcing ring 7 separates from the accommodating portion 32. Accordingly, the valve stem seal 2 is fixed in the accommodating portion 32 of the cylinder head 3.

Manner of Operation and Advantageous Effect

According to the valve stem seal 2 having the above-mentioned configuration, the reinforcing ring 7 is formed into an annular shape centered about the axis x, and extends in the radial direction of a ring of the reinforcing ring 7. Accordingly, a size of the valve stem seal 2 in the height direction along the axis x can be reduced compared to a conventional valve stem seal.

According to the hermetic sealing structure 1 having the above-mentioned configuration, the reinforcing ring 7 is disposed between the inner wall 31 of the cylinder head 3 and the valve spring 6, and is fixed to the cylinder head 3 by pressure from the valve spring 6. Accordingly, the valve stem seal 2 can be easily assembled, and the removal of the valve stem seal 2 can be eliminated and hence, the hermetic sealing structure 1 can stably maintain hermetic sealability for a long period of time. Further, the reinforcing ring 7 extends in the radial direction so that a size of the valve stem seal 2 in the direction of the axis x is small and hence, a size of the hermetic sealing structure 1 per se in the height direction can be reduced. Accordingly, a space on the cylinder head 3 side can be also saved thus contributing to the miniaturization of an internal combustion engine.

Further, the accommodating portion 32 for accommodating the reinforcing ring 7 is formed on the cylinder head 3. Accordingly, an assembling operation of the hermetic sealing structure 1 can be more simplified and, at the same time, a stable attachment state of the valve stem seal 2 can be achieved.

Further, the end portion of the valve guide 4 on the cam side is disposed at a position more toward the cylinder side than the accommodating portion 32 so that the back pressure lip 83 can be disposed in the space S formed between the one end of the valve guide 4 on the cam side and the accommodating portion 32. Accordingly, even when the valve stem seal 2 includes the back pressure lip 83, a height of the entire hermetic sealing structure 1 in the direction of the axis x can be suppressed and hence, the miniaturized hermetic sealing structure 1 can be achieved.

Second Embodiment

Next, with reference to FIG. 4 and FIG. 5, a valve stem seal 21 and a hermetic sealing structure 11 according to a second embodiment of the present disclosure are described. Hereinafter, only parts which make the present embodiment different from the first embodiment are described. Configurations which are equal to the corresponding configurations of the first embodiment are given the same symbols, and the description of such configurations is omitted.

FIG. 4 is a cross-sectional view of the valve stem seal 21 taken along an axis x. FIG. 5 is a cross-sectional view showing a part of the hermetic sealing structure 11 which includes the valve stem seal 21 shown in FIG. 4 in an enlarged manner.

In an elastic body portion 8a of the valve stem seal 21, a covering portion 85 includes a sealing portion which provides sealing between a cylinder head 3 and a reinforcing ring 7 at a position where the reinforcing ring 7 opposedly faces an inner wall of the cylinder head 3. That is, as shown in FIG. 4, the elastic body portion 8a includes the covering portion 85 as the sealing portion extending in the radial direction, the covering portion 85 covering a main surface of the reinforcing ring 7 which faces downward, to be more specific, a surface of the reinforcing ring 7 which opposedly faces a bottom surface portion 32b of an accommodating portion 32 of the cylinder head 3 in a state where the valve stem seal 21 is attached to the cylinder head 3. The covering portion 85 is formed with a uniform thickness and, in the same manner as a seal lip 82 and a back pressure lip 83, is integrally formed with a seal base portion 81.

As shown in FIG. 5, in a state where the valve stem seal 21 is attached to the cylinder head 3, the covering portion 85 is positioned in the accommodating portion 32 of the cylinder head 3, and provides sealing between the cylinder head 3 and the reinforcing ring 7 at a position where the covering portion 85 opposedly faces the bottom surface portion 32b.

In FIG. 4, the covering portion 85 covers an entire main surface of the reinforcing ring 7 which faces downward. However, provided that sealability between the cylinder head 3 and the reinforcing ring 7 can be ensured, it is sufficient for the covering portion 85 to cover at least a portion of the main surface of the reinforcing ring 7 which is brought into contact with the bottom surface portion 32b of the accommodating portion 32.

In FIG. 5, different from the first embodiment, a groove in an annular shape is not formed and an O-ring is not disposed on the bottom surface portion 32b of the accommodating portion 32. However, to enhance sealability between the cylinder head 3 and the reinforcing ring 7, the groove may be formed on the bottom surface portion 32b, and the O-ring may be disposed in the groove.

Manner of Operation and Advantageous Effect

In the second embodiment, the elastic body portion 8 includes the covering portion 85 as the sealing portion. Accordingly, it becomes unnecessary to provide the groove and the sealing member to the cylinder head 3 for ensuring sealing between the reinforcing ring 7 and the cylinder head 3. For this reason, it is possible to reduce the number of operation steps for constructing the hermetic sealing structure 11.

Third Embodiment

Next, with reference to FIG. 6 and FIG. 7, a valve stem seal 22 and a hermetic sealing structure 12 according to a third embodiment of the present disclosure are described. Hereinafter, only parts which make the present embodiment different from the above-mentioned embodiments are described. Configurations which are equal to the corresponding configurations of the above-mentioned embodiments are given the same symbols, and the description of such configurations is omitted.

FIG. 6 is a cross-sectional view of the valve stem seal 22 taken along an axis x. FIG. 7 is a cross-sectional view showing a part of the hermetic sealing structure 12 which includes the valve stem seal 22 shown in FIG. 6 in an enlarged manner.

As shown in FIG. 6, in a state where the valve stem seal 22 is attached to a cylinder head 3, a recessed portion 72 forming a portion to be pressed which is pressed by a valve spring 6 is formed on a main surface of a reinforcing ring 7b of the valve stem seal 22 which faces upward.

The recessed portion 72 is formed at a peripheral edge portion of the reinforcing ring 7 which is disposed on the outer side in the radial direction. The recessed portion 72 is formed with a smaller thickness than other portions of the reinforcing ring 7 thus forming a stepped portion on the reinforcing ring 7. Accordingly, the reinforcing ring 7 has a smaller thickness on the outer side in the radial direction than on the inner side in the radial direction. To be more specific, the recessed portion 72 includes: a side surface portion 72a in an annular shape which extends toward a covering portion 85 from a front surface 71a of a portion of the reinforcing ring 7 other than the recessed portion 72 which faces upward; and a bottom surface portion 72b which extends from the side surface portion 72a in an annular shape in the direction of separation from the axis x, that is, toward the outside in the radial direction.

In the same manner as the second embodiment, an elastic body portion 8b includes the covering portion 85 which covers a main surface of the reinforcing ring 7 on the lower side.

As shown in FIG. 7, in the hermetic sealing structure 12, different from the above-mentioned embodiments, the valve stem seal 22 directly supports an end portion of the valve spring 6 on the cylinder side. That is, the above-mentioned spring washer is not provided, and the valve spring 6 is supported by the bottom surface portion 72b of the recessed portion 72 of the reinforcing ring 7.

The bottom surface portion 72b of the recessed portion 72 is disposed at a position more toward the cylinder side than an inner wall 31 of the cylinder head 3 which faces the cam side. Accordingly, the movement of the valve spring 6 on the outer side in the radial direction is restricted by the side surface portion 32a of the accommodating portion 32 and the side surface portion 72a of the recessed portion 72.

As shown in FIG. 7, the surface of the reinforcing ring 7 which faces the cylinder side is covered by the covering portion 85 which is the sealing portion. However, the reinforcing ring 7 may be directly brought into contact with the bottom surface portion 32b of the accommodating portion 32. Further, a groove in an annular shape is not formed and an O-ring is not disposed on the bottom surface portion 32b of the accommodating portion 32. However, to enhance sealability between the cylinder head 3 and the reinforcing ring 7, the groove may be formed on the bottom surface portion 32b, and the O-ring may be disposed in the groove.

Manner of Operation and Advantageous Effect

In the third embodiment, the recessed portion 72 is formed on the front surface 71a of the reinforcing ring 7. Accordingly, in a state where the valve stem seal 22 is attached to the cylinder head 3, it is possible to support the valve spring 6 while movement of the valve spring 6, particularly in the radial direction, is restricted without using a spring washer.

Fourth Embodiment

Next, with reference to FIG. 8 and FIG. 9, a valve stem seal 23 and a hermetic sealing structure 13 according to a fourth embodiment of the present disclosure are described. Hereinafter, only parts which make the present embodiment different from the above-mentioned embodiments are described. Configurations which are equal to the corresponding configurations of the above-mentioned embodiments are given the same symbols, and the description of such configurations is omitted.

FIG. 8 is a cross-sectional view of the valve stem seal 23 taken along an axis x. FIG. 9 is a cross-sectional view showing a part of the hermetic sealing structure 13 which includes the valve stem seal 23 shown in FIG. 8 in an enlarged manner.

As shown in FIG. 8, a cross-sectional shape of a reinforcing ring 7c of the valve stem seal 23 taken along the axis x is a substantially crank shape. In the same manner as the third embodiment, the reinforcing ring 7 includes a recessed portion 72 which is a portion to be pressed by a valve spring 6. On a back surface 71b of the reinforcing ring 7c which faces downward, that is, on a surface of the reinforcing ring 7c which opposedly faces a bottom surface portion 32b of an accommodating portion 32 in a state where the valve stem seal 23 is attached to the cylinder head 3, the reinforcing ring 7c includes a recessed portion 73 in an annular shape at a portion of the reinforcing ring 7c on an inner side in the radial direction.

The recessed portion 73 includes: a slope portion 73a in an annular shape which is inclined upward toward the axis x from a portion of the back surface 71b other than the recessed portion 73; and a bottom surface portion 73b which extends toward the axis x from the slope portion 73a in an annular shape.

The elastic body portion 8 includes a covering portion 85 which covers the back surface 71b. The covering portion 85 covers the bottom surface portion 73b of the recessed portion 73 in the recessed portion 73, and a distal end of the covering portion 85 on the outer side in the radial direction extends to the slope portion 73a. That is, the covering portion 85 does not cover the entire back surface 71b of the reinforcing ring 7.

A distal end portion of the covering portion 85 on the outer side in the radial direction includes a protrusion 85a which projects downward. The protrusion 85a projects downward from the back surface 71b in the direction of the axis x. In a state where the valve stem seal 23 is attached to the cylinder head 3, the protrusion 85a abuts on an inner wall of the cylinder head 3, to be more specific, the bottom surface portion 32b of the accommodating portion 32.

As shown in FIG. 9, in a state where the valve stem seal 23 is attached to the cylinder head 3, the back surface 71b of the reinforcing ring 7c and the covering portion 85 of the elastic body portion 8 are brought into contact with the inner wall of the cylinder head 3. To be more specific, the reinforcing ring 7 abuts on the bottom surface portion 32b of the accommodating portion 32 of the cylinder head 3 at a portion of the reinforcing ring 7 where the recessed portion 73 is not formed, that is, at the portion of the back surface 71b which is not covered by the covering portion 85. The covering portion 85 which covers the back surface 7b in the recessed portion 73 abuts on the bottom surface portion 32b of the accommodating portion 32 of the cylinder head 3. Further, the protrusion 85a of the covering portion 85 projects toward the cylinder side from the back surface 71b as described above. Accordingly, in a state where the valve stem seal 23 is attached to the cylinder head 3, the protrusion 85a of the covering portion 85 abuts on the bottom surface portion 32b of the accommodating portion 32 thus elastically deforming.

As shown in FIG. 9, a groove in an annular shape is not formed and an O-ring is not disposed on the bottom surface portion 32b of the accommodating portion 32. However, to enhance sealability between the cylinder head 3 and the reinforcing ring 7, the groove may be formed on the bottom surface portion 32b which is not covered by the covering portion 85 and with which the back surface 71b of the reinforcing ring 7 is brought into contact, and the O-ring may be disposed in the groove.

Manner of Operation and Advantageous Effect

In the fourth embodiment, the covering portion 85 which is the sealing portion includes the protrusion 85a which abuts on the inner wall of the cylinder head 3, particularly, on the bottom surface portion 32b of the accommodating portion 32. Accordingly, when the valve stem seal 23 is attached to the cylinder head 3, the protrusion 85a elastically deforms so that higher sealability can be ensured between the cylinder head 3 and the reinforcing ring 7.

Others

In the above-mentioned first to fourth embodiments, the valve stem seal 2, 21, 22, 23 includes the back pressure lip 83. However, the valve stem seal may not include the back pressure lip 83.

What is claimed is:

1. A valve stem seal for hermetically sealing a space formed between a valve stem of a valve which establishes and interrupts communication between a cylinder and a port and a valve guide into which the valve stem is inserted in a reciprocally movable manner, comprising:
    a reinforcing ring formed into an annular shape centered about an axis, and extending in a radial direction that is perpendicular to the axis; and
    an elastic body portion formed into an annular shape centered about the axis, directly attached to the reinforcing ring, and including a seal lip which abuts on the valve stem,
    wherein an entirety of the reinforcing ring is flat and a main surface of the reinforcing ring has one flat surface, and
    wherein the reinforcing ring includes a portion to be pressed which is disposed between an inner wall of a cylinder head and a valve spring, and is pressed by the valve spring.

2. A hermetic sealing structure for hermetically sealing a space formed between a valve stem of a valve and a valve guide, the valve establishing and interrupting communication between a cylinder and a port, and the valve guide having one end facing a cam side and another end facing a cylinder side, the hermetic sealing structure comprising:
    a cylinder head;
    the valve guide arranged on the cylinder head;
    the valve stem inserted into the valve guide in a reciprocally movable manner;
    a valve spring mounted on the cylinder head, and biasing the valve stem in a direction where communication between the cylinder and the port is interrupted; and
    a valve stem seal provided on the valve guide on a side of the one end, wherein
    the valve stem seal includes: a reinforcing ring formed into an annular shape centered about an axis, and extending in a radial direction that is perpendicular to the axis; and an elastic body portion formed into an annular shape centered about the axis, directly attached to the reinforcing ring, and including a seal lip which abuts on the valve stem, and
    an entirety of the reinforcing ring is flat and a main surface of the reinforcing ring has one flat surface,
    the reinforcing ring is disposed between an inner wall of the cylinder head and the valve spring, and is fixed to the cylinder head by pressure from the valve spring.

3. The hermetic sealing structure according to claim 2, further comprising a spring washer disposed adjacent the reinforcing ring, the spring washer comprising a flange portion and a cylindrical portion, the flange portion abutting against the reinforcing ring and the cylindrical portion extending outwards and away from the flange portion in direction parallel to the axis.

4. The hermetic sealing structure according to claim 2, wherein an accommodating portion for accommodating the reinforcing ring is formed in the cylinder head and faces the cam side.

5. The hermetic sealing structure according to claim 4, wherein the one end of the valve guide is disposed at a position more toward the cylinder side than the accommodating portion.

6. The hermetic sealing structure according to claim 4, wherein the elastic body portion includes a back pressure lip which is disposed on a side closer to the valve guide than the seal lip, and abuts on the valve stem, and
    the back pressure lip is disposed in a space formed between the one end of the valve guide and the accommodating portion.

7. The hermetic sealing structure according to claim 4, wherein the accommodating portion comprises a side surface portion and a bottom surface portion, the side surface portion extending in a direction that is parallel to the axis and the bottom surface portion extending in a direction that is perpendicular to the axis.

8. The hermetic sealing structure according to claim 7, wherein a length of the side surface portion is greater than a length of the reinforcing ring in a direction that is parallel to the axis.

9. The hermetic sealing structure according to claim 7, further comprising a spring washer disposed adjacent the reinforcing ring, the spring washer comprising a flange portion abutting against the reinforcing ring, a length of the side surface portion is equal to a sum of a length of the reinforcing ring in the direction that is parallel to the axis and a length of the flange portion in a direction that is parallel to the axis.

10. The hermetic sealing structure according to claim 7, wherein an outer diameter of the reinforcing ring is less than an inner diameter of the side surface portion.

11. The hermetic sealing structure according to claim 7, wherein an outer diameter of the spring is less than an inner diameter of the side surface portion.

12. The hermetic sealing structure according to claim 7, wherein an annular shaped groove is formed in the bottom surface portion, the annular shaped groove being centered about the axis.

13. The hermetic sealing structure according to claim 12, wherein an O-ring is provided within the annular shaped groove.

14. The hermetic sealing structure according to claim 7, wherein a gap is disposed between the valve guide and the bottom surface portion of the accommodating portion in a direction that is parallel to the axis such that the valve guide is disposed at a location that is spaced from the bottom surface portion in an axial direction.

15. The hermetic sealing structure according to claim 7, wherein the elastic body portion includes a covering portion covering a surface of the reinforcing ring, the surface of the reinforcing ring opposedly faces the bottom surface portion of the accommodating portion.

* * * * *

UNITED STATES PATENT AND TRADEMARK OFFICE
CERTIFICATE OF CORRECTION

PATENT NO. : 10,767,519 B2  
APPLICATION NO. : 15/893853  
DATED : September 8, 2020  
INVENTOR(S) : Masamichi Kishiro Page 1 of 1

It is certified that error appears in the above-identified patent and that said Letters Patent is hereby corrected as shown below:

In the Specification

Column 2, Line 32, "Publication No. 4417107, the" should read -- Publication No. 4-117107, the --

Column 5, Line 27, "to the distil end portion" should read -- to the distal end portion --

Column 11, Line 8, "back surface 7b in the" should read -- back surface 71b in the --

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*